(12) United States Patent
Dumont et al.

(10) Patent No.: US 7,141,895 B2
(45) Date of Patent: Nov. 28, 2006

(54) CIRCUIT ARRANGEMENT COMPRISING A POWER SUPPLY UNIT

(75) Inventors: Frank Dumont, Singapore (SG); Andrzej Ziolkowski, Singapore (SG); Jean Paul Louvel, Brigachtal (DE)

(73) Assignee: Thomson Licensing, Boulogne-Billancourt (FR)

( * ) Notice: Subject to any disclaimer, the term of this patent is extended or adjusted under 35 U.S.C. 154(b) by 408 days.

(21) Appl. No.: 10/451,605

(22) PCT Filed: Dec. 10, 2001

(86) PCT No.: PCT/EP01/14461

§ 371 (c)(1),
(2), (4) Date: Jun. 20, 2003

(87) PCT Pub. No.: WO02/50986

PCT Pub. Date: Jun. 27, 2002

(65) Prior Publication Data

US 2004/0046457 A1    Mar. 11, 2004

(30) Foreign Application Priority Data

Dec. 21, 2000  (EP) .................................. 00403651

(51) Int. Cl.
*H02J 3/00* (2006.01)
(52) U.S. Cl. ....................................................... 307/85
(58) Field of Classification Search ................ 307/116, 307/85
See application file for complete search history.

(56) References Cited

U.S. PATENT DOCUMENTS 4,773,096 A * 9/1988 Kirn ........................... 381/120
5,692,818 A * 12/1997 Kitagawa ................... 353/26 R
5,949,660 A * 9/1999 Rehm et al. .............. 363/21.07
6,002,598 A * 12/1999 Seinen et al. .................. 363/49
6,097,616 A    8/2000 Iwasaki ........................ 363/97
6,314,523 B1 * 11/2001 Voltz .......................... 713/324

(Continued)

FOREIGN PATENT DOCUMENTS

EP          0 803 966        10/1997

*Primary Examiner*—Brian Sircus
*Assistant Examiner*—Dru Parries
(74) *Attorney, Agent, or Firm*—Joseph J. Laks; Harvey D. Fried; Sammy S. Henig

(57) ABSTRACT

The circuit arrangement comprises a power supply unit with a first power supply only for the analogue signal processing part and for the control part of a respective device. For the digital signal processing part, a second, separate switched mode power supply is provided, which is switched off, when only the analogue signal processing part is active, and which is in operation, when the digital signal processing part is on. For switching on and off of the second switched mode power supply, the power supply comprises a switching circuit (18), which is coupled in a special embodiment to a control loop (15) on the secondary side, for switching off the second power supply at the primary side via a galvanic isolating means (14). The switching circuit is provided with a supply voltage (12VS) from the first power supply and receives the on/off command from the control part, e. g. a microprocessor. The power supply unit is used advantageously within a D-VHS recorder, and the first power supply provides the power for the control part and the analogue circuit processing of the recorder. The second switched mode power supply is associated with the digital signal processing part. The second switched mode power supply is switched on for example, when a D-VHS tape is inserted into the recorder.

5 Claims, 1 Drawing Sheet

U.S. PATENT DOCUMENTS 6,418,424 B1 * 7/2002 Hoffberg et al. ............... 706/21
6,630,914 B1 * 10/2003 Tamekuni et al. ............. 345/8
2002/0024892 A1 * 2/2002 Ando et al. ............... 369/30.25
2002/0074504 A1 * 6/2002 Moses et al. .......... 250/370.09

* cited by examiner

CIRCUIT ARRANGEMENT COMPRISING A POWER SUPPLY UNIT

This application claims the benefit under 35 U.S.C. § 365 of International Application PCT/EP01/14461 filed Dec. 10, 2001, which claims the benefit of European Application No. 00403651.3 filed Dec. 21, 2000,

FIELD OF THE INVENTION

The invention refers to a circuit arrangement comprising an analogue signal processing part, a digital signal processing part and a power supply unit, as used for example within devices of audio and video equipment of consumer electronics. Devices of this kind incorporate more and more digital electronics, but for essential parts still analogue circuit processing is used, or is used in parallel to digital electronics. A new kind of video tape recorders for example, known as D-VHS recorders, are able to write and read data in analogue manner according to the VHS standard and to write and read digital data according to the MPEG-2 standard in conformity to the D-VHS standard.

BACKGROUND OF THE INVENTION

A power supply unit comprising a first switched mode power supply only for a standby mode operation and a second switched mode power supply for a normal mode of operation is disclosed in EP-A-0 803 966. Both switched mode power supplies are synchronized with respect to the switching frequency and the second switched mode power supply is switched on via the first switched mode power supply for normal mode operation.

SUMMARY OF THE INVENTION

The circuit arrangement according to the invention comprises a power supply unit with a first power supply only for the analogue signal processing part and for the control part of the respective device. For the digital signal processing part, a second, separate switched mode power supply is provided, which is switched off, when the analogue signal processing part is active. The second power supply is in operation, when the digital signal processing part is active.

Within a D-VHS recorder for example, the first power supply provides the power for the control part of the recorder, which comprises usually a microprocessor for the control of the tape operations, for interpreting remote control commands, for the timer mode, and for the keyboard and display drivers; and provides further the power for the analogue signal processing parts, which are responsible for writing and reading of the analogue tape signals according to the VHS standard. For the digital signal processing part according to the D-VHS standard, a second switched mode power supply is responsible, which is in operation when the D-VHS mode is active, especially when a respective D-VHS recording or reading is carried out. Finally, the digital signal processing part is also active when a digital signal is received through a digital interface, e.g. DV1394 IN.

For switching on and off of the second switched mode power supply, the power supply comprises a switching circuit which is coupled in a special embodiment to a control loop of this power supply on the secondary side, for switching off the second power supply at the primary side via a galvanic isolating means. The switching circuit is provided with a supply voltage from the first power supply and receives the on/off command from the control part, e. g. a microprocessor. The second switched mode power supply is switched on for example, when a D-VHS tape is inserted into the recorder, and stays on, as long as the D-VHS tape remains in the recorder or as long the digital signal processing part is active for signal improvement of signals played back from an analogue VHS tape.

The second switched mode power supply is especially a complete switched mode power supply coupled to the mains AC voltage. In one embodiment of the invention it is arranged separately on a printed circuit board. It comprises advantageously also a mains filter for reducing switching noise. Therefore, when the digital signal processing part together with its switched mode power supply is off, there exists no additional noise for the analogue signal processing part, which are very sensitive to noise of a switched mode power supply.

Further, there is a considerable power consumption reduction as compared with a tape recorder with only one switched mode power supply, because both switched mode power supplies work with optimum efficiency. A further important advantage of the two-power-supply concept is that the digital signal processing part requires additional supply voltages, which can be easily provided by a second transformer. A power supply unit with only one mains transformer would require many secondary windings and additional output pins, which would demand for a special development of a bulky mains transformer.

BRIEF DESCRIPTION OF THE DRAWING

The invention is explained in more detail below, by way of an example, with reference to a schematic circuit diagram, in which the only FIGURE shows a switched mode power supply for a digital signal processing part.

DETAILED DESCRIPTION OF PREFERRED EMBODIMENTS

Figure 1:
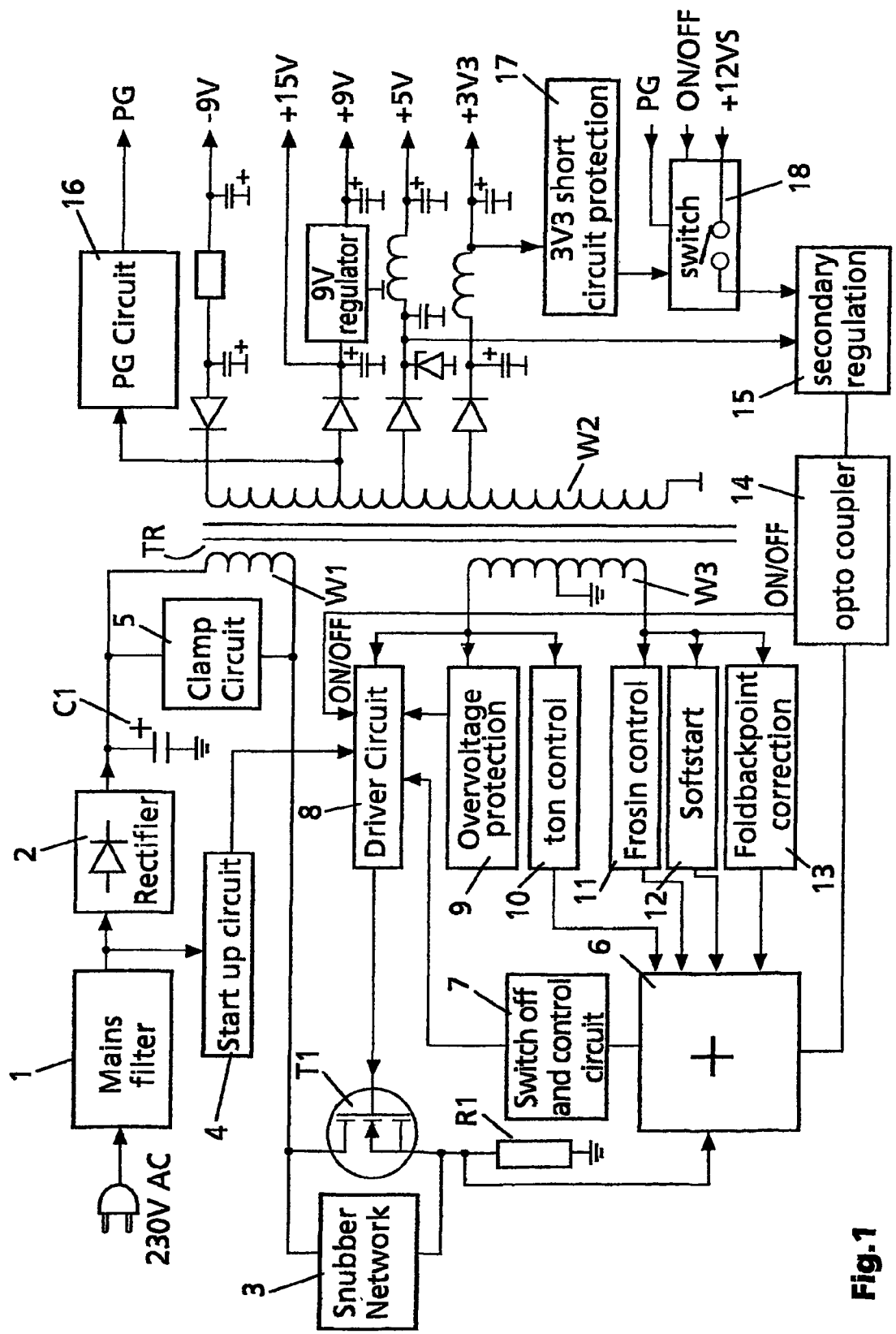

The switched mode power supply according to the FIGURE is arranged within a circuit arrangement as a second power supply associated with a digital signal processing circuit. It comprises a transformer TR with a primary winding W1, an auxiliary winding W3 on the primary side, and a secondary winding W2 on the secondary side, providing mains isolation as known from current flyback converters. The input of the switched mode power supply is coupled to a 230 V AC mains voltage, which is filtered by a mains filter 1, rectified by a rectifier circuit 2 and smoothed by a charge capacitor C1 before applied to the primary winding W1 of the transformer TR. In series to the primary winding W1 a switching transistor T1, for example a power MOSFET, and a sensing resistor R1 is arranged. In parallel to the primary winding W1 a clamp circuit 5 and in parallel to the switching transistor T1 a snubber network 3 is arranged for avoiding excessive voltage spikes, when the switching transistor T1 switches off.

The switched mode power supply comprises a secondary regulation circuit 15 coupled to the +5V output voltage, for providing output voltage regulation. The secondary regulation circuit 15 derives an error signal from the 5V output voltage, which is guided via a galvanic isolating element, an opto-coupler 14, to the primary side and coupled to the driver circuit 8 of the switching transistor T1. As a further regulation information the voltage above the sensing resistor R1 is used.

Further control and protection circuits are arranged on the primary side of the switched mode power supply, which information signals are all summed up in a summing circuit 6. A summing circuit 6 of this kind is disclosed for example in U.S. Pat. No. 5,867,373, which comprises a capacitor for summing up the currents. The information of the summing circuit 6 is used by a switch off and control circuit 7, for driving the switching transistor T1 via the driver circuit 8 by adjusting the duty cycle, so that the output voltages of the power supply, preferring the 5V output, are regulated.

In detail, to one end of the auxiliary winding W3 an over-voltage protection circuit 9 is coupled, which stops the switched mode power supply directly via the driver circuit 8 in case of an over-voltage, and a T-ON control circuit 10. This T-ON control circuit defines the minimum duty cycle of the switching transistor T1 to ensure that the switching transistor T1 is always well saturated during the switching-on phase.

To the other end of the auxiliary winding W3 a control circuit 11, a soft start circuit 12 and a foldback point correction circuit 13 are coupled. The control circuit 11 defines the timing of the switching-on of the switching transistor T1 with regard to the demagnetisation of the transformer TR for switching through T1 in a minimum of the collector voltage. This switching principle is disclosed for example in U.S. Pat. No. 5,657,218.

The soft start circuit 12 provides a soft start-up of the power supply after switching on of the respective device. The foldback point correction circuit 13 is a small circuit, which makes the maximum output power of the switched mode power supply independent of the amplitude of the mains voltage. A power good circuit 16, arranged at the secondary side of the switched mode power supply, derives an information about the mains voltage, which is used to stop the switched mode power supply when the mains voltage is too low.

The switched mode power supply according to the FIGURE is used especially as the power supply for the digital signal processing part of a D-VHS video recorder. For the analogue signal processing part of the recorder, a further power supply, advantageously also a switched mode power supply which can be similar to the switched mode power supply of the digital part, is used. Both switched mode power supplies operate independently, the second one only requiring an operating voltage, for example 12 Volts, for the switching circuit 18. The ON/OFF command for switching on and off of the second switched mode power supply is provided by a micro-controller of the circuit arrangement, which is powered by the first switched mode power supply and which is therefore always on, when the recorder is on. The control of the circuit arrangement may be provided also by a system controller independent of the micro-controller. The micro-controller may provide the operating voltage for the switching circuit 18 only in a time interval, in which the ON-signal is applied to the second switched mode power supply.

The power good circuit 16 provides a control of the mains input voltage and provides a switch-off signal PG, when the mains input voltage is too low. This control signal can be applied advantageously also to the switching circuit 18, arranged at the secondary side, for switching the switched mode power supply off, when the mains input voltage is too low. The power good circuit 16 generates the switch-off signal PG for example after a mains interruption, with a delay of 20 msec. After a mains interruption, the ON/OFF signal applied to the switching circuit 18 must be switched off for about four seconds and then switched on again due to safety reasons.

The circuit arrangement with a two-power-supply concept as described above is especially advantageous for a D-VHS video recorder. But further applications, especially in the field of consumer electronics, as for example set top boxes, CD- and DVD-players and -recorders, are also within the scope of the present invention.

What is claimed is:

1. Circuit arrangement comprising an analogue signal processing part, a digital signal processing part, a control part including a micro-controller and a power supply unit, wherein said power supply unit comprises:
    a first switched mode power supply for said analogue signal processing part and for said control part, and
    a second switched mode power supply with a transformer having a primary and a secondary side for providing power to said digital signal processing part, said second switched mode power supply comprising on the secondary side a switching circuit coupled to a control loop for output power regulation of said second switched mode power supply, said switching circuit being provided with a constant supply voltage from said first switched mode power supply, said second switched mode power supply being switched on and off by said micro-controller via said switching circuit.

2. Circuit arrangement according to claim 1, wherein said micro-controller switches on and off said second switched mode power supply on the primary side via a coupling means.

3. Circuit arrangement according to claim 1, wherein said first and second switched mode power supply comprise its own start-up circuit and transformer for mains isolation.

4. Circuit arrangement according to claim 3, wherein said second switched mode power supply is arranged separately on a printed circuit board and comprises its own mains filter, which is coupled to a mains input voltage.

5. Circuit arrangement to according to claim 1, wherein the circuit arrangement is arranged within a D-VHS video recorder, and the first switched mode power supply is provided for supplying power to the analogue reading and recording part, to the drive mechanism and to the controlling part of the recorder.

* * * * *